Patented Oct. 18, 1932

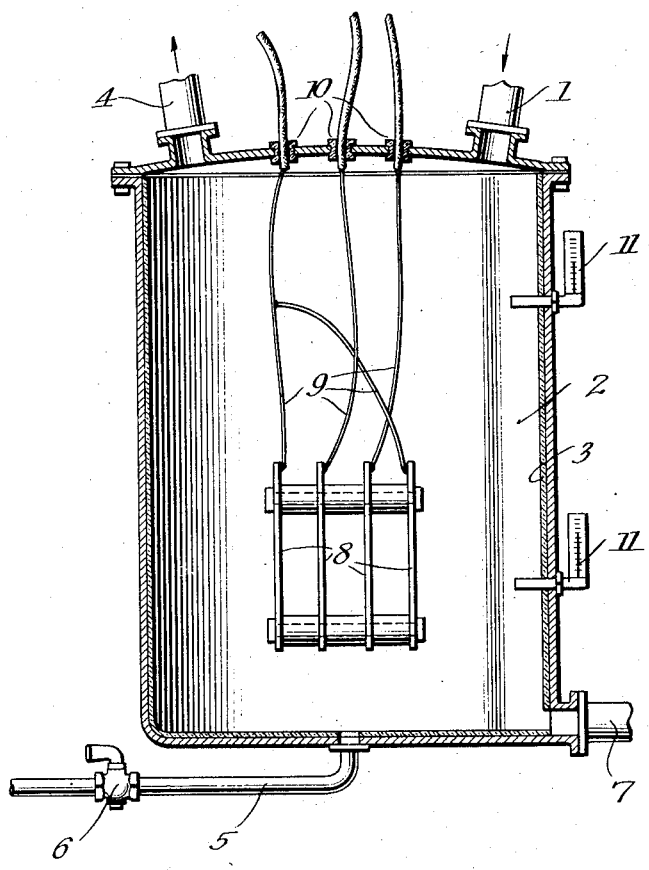

1,883,420

UNITED STATES PATENT OFFICE

HENRY C. STEPHENS, OF WHEELING, WEST VIRGINIA, ASSIGNOR TO HAZEL-ATLAS GLASS CO., OF WHEELING, WEST VIRGINIA, A CORPORATION OF WEST VIRGINIA

METHOD OF PRESERVING FRUIT JUICES

Application filed January 3, 1929. Serial No. 329,981.

While the method will be described particularly in connection with citrous fruit juices, such as orange juice, yet it is to be understood that the method is equally well adapted to the preservation of other fruit juices, vegetable juices, milk and other liquids, olive oil and other oils, mayonnaise and other oil products.

Assuming that the method is to be employed in the preservation of orange juice, it is desirable that the juice reach the processor in as pure and uncontaminated condition as possible; and with little if any contact with the air. In the preparatory stages, sound, ripe oranges are thoroughly cleaned, and then sliced mechanically and the juice extracted therefrom under a blanket of carbon dioxide, or other heavy neutral gas. The juice is freed from seeds and skins by passing through a strainer, while still under a carbon dioxide blanket. It may be mentioned here, that in accordance with the present method, all of the pulp, or any desired proportion of it may be retained.

The orange juice, obtained in the foregoing manner, is preferably drawn into the processor by vacuum.

By reference to the drawing, in which the figure is a diagrammatic view of a suitable apparatus for carrying out the process, numeral 1 indicates a pipe through which the orange juice is drawn or otherwise introduced into the processor 2, which comprises a metallic tank lined with glass, as indicated by numeral 3.

Connected with the top of the processor is a pipe 4 which leads to a vacuum pump or other means for producing and maintaining a high vacuum in the processor; and connected to the bottom of the processor, preferably centrally thereof, is a pipe 5 which supplies carbon-dioxide or other inert gas from a suitable source. The pipe 5 is provided with a valve 6, for regulating the volume of gas supplied to the processor, and both the pipe and valve are preferably made of pure nickel. A pipe 7 leads from the bottom of the processor to a filling machine, for the purpose of drawing off the orange juice after it has been processed. The pipes 1, 4 and 7, are also made of pure nickel or other suitable material, and each of these pipes is also provided with a valve (not shown) similar to the valve 6 of pipe 5.

Suitably spaced electrodes 8 are arranged in the desired position within the processor, and in the particular apparatus illustrated herein, the electrodes are supported by the conductors, which pass through suitable insulators 10, in the top of the container or processor. Of course, the electrodes may be supported at the proper elevation in the container, by any other desired means. The electrodes and associated parts and the conductors are preferably made of silver; and I also preferably employ a three phase alternating current. For the purpose of determining the temperature of the contents of the container, thermometers 11 are mounted on the container at the desired locations.

In practice I also provide in the wall of the processor, at the desired position, a pyrex window; and a similar window is also in the top of the container. The processor is also provided with a registering thermometer which automatically shuts off the current when the desired temperature is reached. The processor is also equipped with a vacuum and pressure gauge. It is thought to be unnecessary to show these elements in the drawing.

It is to be noted that the top of the container is removable, whereby the interior of the container may be easily and thoroughly cleansed. Of course, the top is secured to the container by an air-tight joint.

In carrying out the process, the orange juice, or other raw material is protected from oxidation and contamination from air, as far as possible, by suitably arranged blankets of carbon-dioxide, and the orange juice is preferably drawn into the container or processor 2 by vacuum. In other words, the orange juice is prepared and introduced into the processor in as pure a condition as possible, and I may employ any desired apparatus or method for accomplishing that result.

A high vacuum is maintained in the processor, and as the orange juice in introduced carbon-dioxide or other inert gas is bubbled through it from the bottom; and this is continued for the required length of time, the carbon-dioxide being used in large volumes. The carbon-dioxide is introduced for the purpose of freeing the orange juice of residual oxygen; and several very desirable results are accomplished by introducing this gas under a high vacuum. For example, the orange juice can best be swept free of oxygen by having the juice agitated while the carbon-dioxide is bubbling through it. By introducing this gas, or a similar gas, at the bottom of the processor, under a high vacuum, a very violent agitation, similar to boiling, is caused. The best results can be obtained only when the contents of the processor are under this violent agitation during the carbon-dioxide treatment. Of course, the high vaccum also carries off the oxygen as it is freed from the material; and also prevents too high a concentration of the carbon-dioxide. Also, as will appear hereinafter, the violent bubbling of carbon-dioxide, sets up a current in the material being treated, so that the material is being constantly carried between and around the electrodes.

While the orange juice is being freed of oxygen, and is being agitated, three phase alternating current is passed through it by means of the silver electrodes, until the juice is raised to the temperature of pasteurization (160° F. or less). During the electrical action the contents of the processor are passing continuously between and around the electrodes, by reason of the current which is set up by the carbon-dioxide under high vacuum. Of course, the invention is not limited to any particular form of electrodes, or to any particular arrangement of the electrodes in the processor. But I prefer to arrange the electrodes substantially centrally of the processor and spaced some distance from the bottom thereof; and the inlet for the carbon-dioxide being arranged directly beneath the electrodes. By this arrangement, the carbon-dioxide bubbles up through the central portion of the processor contents, under high vacuum, and carries part of the contents with it, up around and between the electrodes, certain bacteria being destroyed by the electrical action. And this constantly upward movement centrally of the contents, sets up a current, so that all of the contents gradually pass up through and around the electrodes and then downwardly about the sides of the processor. Thus not only is the juice carried within the sphere of the electrical action, but also it is kept constantly under violent agitation, thereby permitting it to be thoroughly freed of oxygen by the action of the carbon-dioxide. It is needless to state that there may be many arrangements of the electrodes and gas inlets, to produce the effect desired in this method, and I have merely illustrated one such arrangement.

It is to be particularly noted, that in accordance with my method, there is no chance of the contents becoming "skin-burned" which is one of the highly objectionable features of methods heretofore suggested, for in accordance with the present method the electrodes themselves do not become any hotter than the body of the liquid.

It is also to be noted that in accordance with the present invention, low temperature pasteurization is employed, and the bacteria which are not destroyed by the low temperature, are electrocuted by the electrical action. The use of low temperature pasteurization is most desirable, for it permits the material being treated to retain its original flavors and bouquet, and the vitamines and enzymes are not destroyed by oxidation. It will be understood, of course, that the temperature employed will be varied to some degree in accordance with the acidity or hydrogen ion concentration.

It may also be mentioned that by the method disclosed herein, all of the pulp or any desired proportion thereof, may be retained, for no constrictions are required in the processor or in any of the lines associated therewith; also that this process of treating the fruit juices or other material in batches, is very rapid, and relatively inexpensive, as compared with the methods previously suggested in which the juices are treated in a continuously flowing line.

After the material is treated by the foregoing method, it is disposed of in any desired manner. But I prefer to pack the orange juice or other fruit or vegetable juices in glass containers under high vacuum; and of course, the containers and caps are thoroughly sterilized just prior to being used. Also, throughout the entire process, including the packing of the juices in the glass containers and vacuum sealing them, the juices do not come into contact with any material which could have any deleterious effect. The only materials with which the food substances come into contact, throughout the entire process, are glass, nickel, silver, gold, platinum, pure metallic tin, and inert gases.

The high vacuum sealing, which I preferably employ, represses the growth of certain organisms which the low temperature pasteurization has not altogether destroyed; and it may be mentioned that the method disclosed herein is so thorough and complete that I find the juices will withstand spoiling for several days after the package has been opened.

It will be understood that the invention is not limited to the use of electrical pasteurization during the deoxygenation process; but on the contrary, the electrodes may be omitted, and the pasteurization accomplished by heating the contents in any desired manner while the juice is being freed of oxygen. Or, after the juice has been deoxygenized it may be subsequently packed and pasteurized in any well known or desired manner.

It may be mentioned that the method described herein, when practiced in connection with sauerkraut juice and other vegetable and fruit juices, prevents the subsequent decolorization of the produce when packed in glass. Prior to the present invention one of the disadvantages of packing such juices in glass, has been this resultant decolorization.

Having fully described the invention, what I claim is:

1. The method of preserving fruit juices and other food substances, which comprises violently agitating the juices by bubbling inert gases therethrough under high vacuum, and at the same time subjecting the material to the electrical action of an alternating current.

2. The method of preserving fruit juices and other food substances, which comprises introducing the juices into a processor, violently agitating the juices by producing a high vacuum therein and simultaneously passing carbon-dioxide through the juices, and passing an electric current through the juices by means of electrodes arranged within the processor.

3. The method of preserving fruit juices and other food substances, which comprises introducing the juices into a vacuumized container, introducing inert gases into the bottom of the container and maintaining a high vacuum at the top of the container, and subjecting the juices to the action of an electric current between the top and bottom of the container.

4. The method of preserving fruit juices and other food products, which comprises introducing the juices into a vacuumized processor, setting the contents into violent agitation and causing the contents to travel through the sphere of action of an electric current by the introduction of an inert gas.

5. The method of preserving fruit juices and other food products, which comprises introducing the juices into a vacuumized processor, setting the contents into violent agitation and causing the contents to travel through the sphere of action of an electric current by the introduction of an inert gas under vacuum.

HENRY C. STEPHENS.